United States Patent [19]

Jaeger

[11] 4,412,243
[45] Oct. 25, 1983

[54] METHOD OF REPRODUCING COLORED MOTION PICTURES

[75] Inventor: Walter Jaeger, Cureglia, Switzerland

[73] Assignee: GX-Holding AG, Basel, Switzerland

[21] Appl. No.: 139,292

[22] Filed: Apr. 11, 1980

[30] Foreign Application Priority Data

Apr. 12, 1979 [CH] Switzerland .......................... 3497/79

[51] Int. Cl.³ .............................................. H04N 9/07
[52] U.S. Cl. ......................................... 358/334; 358/49
[58] Field of Search ........................... 358/9, 41, 49, 43

[56] References Cited

U.S. PATENT DOCUMENTS

| Re. 29,135 | 2/1977 | Sugihara | 358/9 X |
|---|---|---|---|
| 3,544,012 | 8/1970 | Kihara | 358/9 |
| 3,560,635 | 2/1971 | Bruch | 358/9 |
| 3,637,919 | 1/1972 | McVoy | 358/9 |
| 3,812,528 | 5/1974 | Flory | 358/49 |
| 3,921,203 | 11/1975 | Okey | 358/9 |
| 4,213,145 | 7/1980 | Nagumo | 358/41 X |

FOREIGN PATENT DOCUMENTS 1274164 8/1968 Fed. Rep. of Germany .......... 358/9

*Primary Examiner*—Stuart N. Hecker
*Attorney, Agent, or Firm*—Eric P. Schellin

[57] ABSTRACT

Video information is recorded and stored on an information carrier in the form of a signal sequence corresponding to a sequential scan of two images of a moving colored motif. The two images correspond to interlaced color extracts. The recorded signal sequence is divided into two, one for each of the two images and these split into three primary color signals for application to a domestic color television receiver set.

7 Claims, 14 Drawing Figures

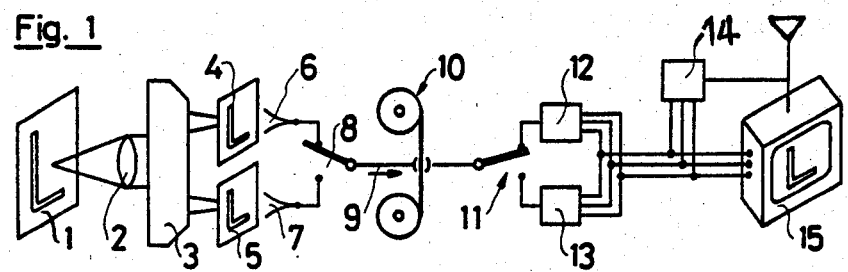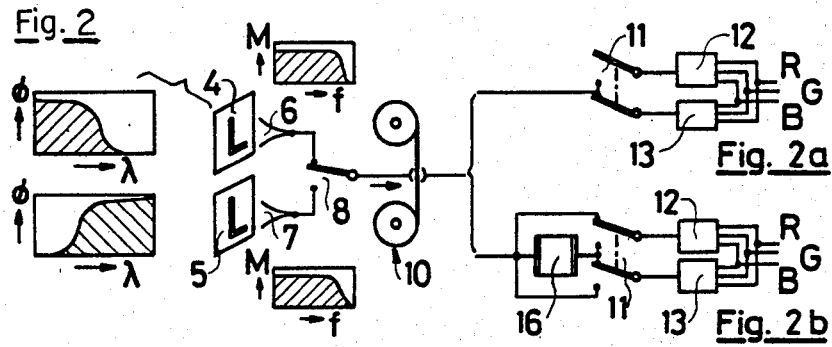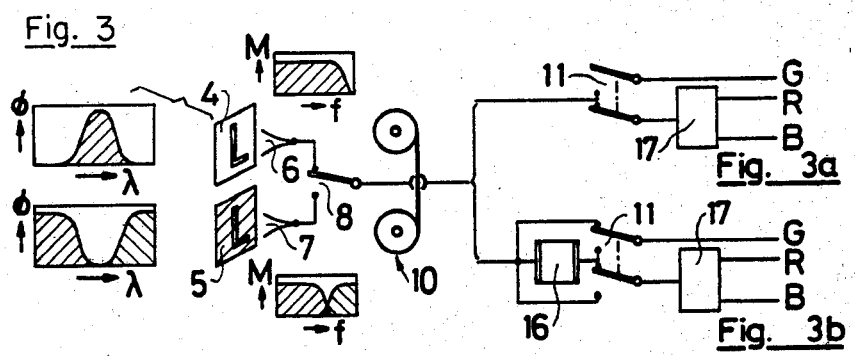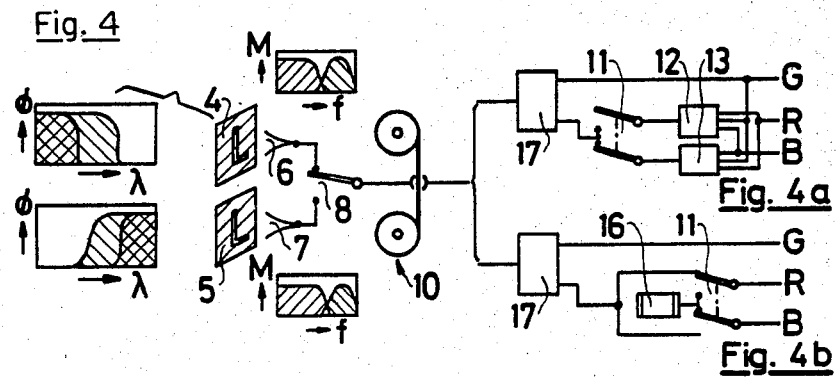

METHOD OF REPRODUCING COLORED MOTION PICTURES

BACKGROUND OF THE INVENTION

This invention relates to a method of motion-picture-video recording and reproducing a moving colored motif.

It is known to reproduce colored moving motifs by recording, or storing, the pictorial contents thereof on an information, or data carrier. The recording must contain not only the brightness information but also the color information data, e.g. colour type and chroma saturation. However, the simultaneous recording of brightness- and two kinds of colour information data demands a considerable outlay of apparatus. To provide the capability to record and store only two kinds of information simultaneously at any given time, it is customary, e.g. according to the SECAM method, to record the brightness information continuously while the two color informations are recorded one at a time in alternate line scans. The color information is in such case recorded as a color difference signal which assumes zero value for a monochrome picture. For this reason it is still necessary, when working by this method, to record two kinds of information data simultaneously at any given time and it is customary, e.g. according to the SECAM method, to record the brightness information continuously while the two color informations are recorded one at a time in alternate line scans. The color information is here recorded as a color difference signal which assumes zero value for a monochrome picture. For this reason it is still necessary, when working by this method, to record two kinds of information data simultaneously while simultaneous pictorial information concerning brightness, color type and chroma saturation, or three other characteristic parameters are required.

It is the aim of the present invention to provide a method which requires the recording of only one signal at a time.

SUMMARY OF THE INVENTION

This aim is achieved in a method of the kind specified thanks to the fact that the pictorial information is recorded on an information-carrier in the form of a signal sequence corresponding to the sequential scan of two images which in turn correspond each to one color filter extract or at least two intermeshed color filter extracts. This recorded signal sequence is then divided into two signal sequences each associated with at least one of the two images and the two signal sequences thus formed are split up into three primary color signals which can be applied to a domestic color television receiver set. It is well known that two informations for each dot or point of the picture are sufficient to produce an acceptable and attractive colour reproduction. The inferior resolution capacity of our natural visual apparatus with regard to red and blue, however, also enables a clear and not only pleasantly acceptable but also color true picture to be obtained by a sharply focussed reproduction of a predominantly green spectrum extract which is additively superimposed by two, substantially less sharply focussed, blue and red colour extracts. Both these conditions can be satisfied if at least one of the images contains the pictorial information of two intermeshed color extracts of two different colors while the second image contains at least partially the color extract which corresponds to a third, predominantly green color filter, and if the signal sequence which corresponds to the intermeshed color extracts is divided into two signal sequences each corresponding to one of the two intermeshed color extracts and the resulting signal sequences which are associated with at least one color screen are converted into three primary color signals which can be applied to a domestic color television receiver set. In order to obtain sharply defined oblique edges, advantageously both images contain the pictorial information of two differently colored intermeshed color extracts, one of which, at least predominantly, contains green.

In order to obtain a line- and flicker-free picture it is advisable to repeat the sequential scan-corresponding signals of at least one of the two divided, sequentially interrupted signal sequences and scramble or bank (intermesh) this repeat signal sequence with the original signal sequence to make up an uninterrupted continuous signal sequence.

A flicker-free picture can be easily obtained in a line-sequential scan by repeating the sequential line scan-corresponding signals by means of a delay line, particularly by means of an electro-acoustic ultrasonic delay circuit.

Band jitter frame- or picture-sequential recording tends to result in an unsteady picture with frayed or blurred vertical edges. This can be avoided if the signals which correspond to a frame-sequential scan are repeated by means of at least one random access memory the output of which is synchronised in time with the start of each line contained in the associated directly transmitted signal.

In order to avoid side-to-side color distortion, or 'cross-talk', it is an advantage if the intermeshed color extracts are divided by means of a photo-electric transducer wherein the photosensitive layer, or film, consists of two relatively electrically isolated but intermeshed or mating parts each having its own electric connections and at least one of the two mating parts in said photosensitive layer being covered on the image-receiving side thereof by a color filter.

For obtaining suitable television signals it is advisable if the stored signal sequence corresponds to an interline- or interlacing scan.

For obtaining a picture of good impression and simple division of the scanned signals it is an advantage if the color extracts are intermeshed in such a way that the scan produces a pulse-modulated signal with a fundamental frequency within the range 0.02 to 2 MHz, preferably between 0.2 and 1 MHz. This is accomplished by division of the picture into two different intervening color bands having selected widths and a predetermined inclination as hereinafter described in detail.

BRIEF DESCRIPTION OF DRAWING FIGURES

The invention is hereinafter more particularly described by way of example with reference to the accompanying drawings wherein:

FIGS. 1 to 4 illustrate schematically various examples of lay-outs or arrangements of apparatus for the application of the method according to this invention, FIG. 5 shows, on a considerably enlarged scale, a detail of one part of a layout for producing an intermeshed color extract, FIG. 6, also on a considerably enlarged scale, shows a detail of one part of a layout for producing an intermeshed, or banked signal sequence.

FIG. 7 is a longitudinal section through an arrangement for simultaneous picture scanning and signal-commutation, and FIG. 8 is a cross section taken on line VIII—VIII.

In the following specific description like references are used for analogous parts.

DETAILED DESCRIPTION OF PREFERRED EMBODIMENTS

Figure 5:
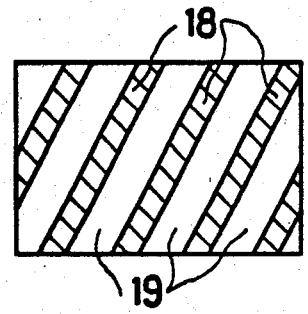

As will be seen from FIG. 1, the motif 1 is reproduced in two images 4 and 5 by means of a lens 2 and an optical image splitter 3. By means of two photo-electric scanners 6 and 7 these two images 4 and 5 are each converted into electrical signals. In this way the space-related pictorial information is converted into time-related signal information. By means of a commutator 8 a signal sequence is formed which contains the signal informations associated with the images 4 and 5 in sequentially interlaced- or intermeshed form.

The interlacing, or intermeshing may be arranged in such a way that, for example, the signal information in signal sequence 9 corresponds to one dot in one line, or to one half frame or picture, or to one full frame or picture of images 4 and 5. The signal sequence 9 is recorded and stored on an information- or data carrier, such as a moving magnetic tape 10 as shown.

Figure 6:
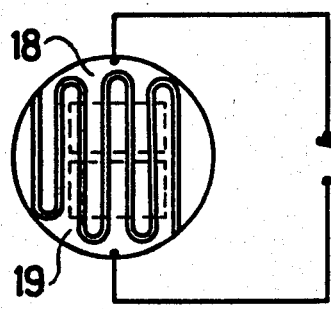

For reproduction, the recorded signal sequence 9 is picked up from the moving magnetic tape 10 and fed sequentially by commutator 11 to two different matrices 12, 13 The matrices 12, 13 are color signal separators as described with respect to matrix 35 of FIG. 6 in my prior copending U.S. application Ser. No. 71,074, now U.S. Pat. No. 4,301,467, filed Aug. 30, 1979, the disclosure of which is incorporated herein by reference. Such matrices process the signal information received into separate color signals of the kind required by a conventional domestic color television receiver set 15. The color signals are fed to this set either directly, or, where applicable, through an intervening device 14, e.g. a PAL coder with subsequent high frequency modulation. The device 14 performs its function by generating a composite video signal modulating the usual broadcast frequency carrier signal, as will be apparent to anyone skilled in the art.

Figure 7:
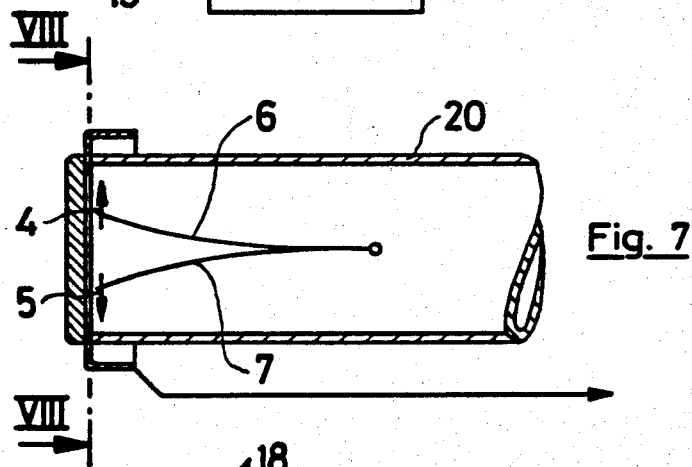
Figure 8:
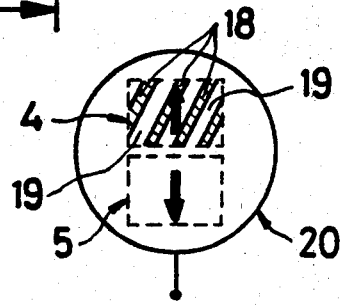

The commutator 8 may actually be dispensed with if, as shown in FIGS. 7 and 8, the scanners 6,7 operate in such a way that only one of the two picture informations is effectively applied in sequential alternation. Operation of the switching element 8 when utilized is controlled by timing signals for synchronism with operation of scanners 6 and 7 as described in my prior copending application, aforementioned, with respect to synchronizer 33 shown in FIGS. 6 and 9 thereof. Operation of switching element 11 is controlled by timing signals derived from video signals in line 9 through a separation circuit which also generates a sync signal for the TV set as described with respect to circuit 37 of FIG. 9 in my prior copending application.

The splitting and scanning of the image is preferably carried out in the manner also disclosed in my prior copending application.

The lay-outs depicted in FIGS. 2 to 4 essentially correspond to that shown in FIG. 1, with the motif 1, the lens 2 and the image splitter 3, as well as the intermediate device 14 and the domestic color television receiver set 15 being omitted from these figures.

By comparison with FIG. 1, FIGS. 2 to 4 graphically show the filter curves $\phi(\lambda)$ of those color filters which are applied to produce the images 4 and 5 and correspond to their color extracts, $\phi$ being the filter transparency and $\lambda$ the wavelength of the light.

FIGS. 2 to 4 also graphically illustrate the modulation depth or percentage M as a function of the pictorial information signal frequency f.

FIG. 2a otherwise corresponds precisely to FIG. 1.

The lay-out according to FIG. 2b further comprises a repeater device 16 in order to avoid interfering line structure and/or flicker, in such a way that two continuous uninterrupted signal sequences appear behind the commutator 11. For line-by-line commutation by means of commutator 8 this repeater device 16 will be an electro-acoustic ultrasonic delay circuit whilst for frame-by-frame commutation it is preferred to use a random access memory.

FIG. 3 shows how one of the two images 4,5 is advantageously used as two differently colored, interlaced images and the modulation-transfer functions which are involved in this process.

Since a pulse modulation is involved, the signals which are associated with the two interlaced images can be separated by means of a frequency- or time selector network 17 as shown in FIG. 3b.

FIG. 3b shows how the three output signals R.G.B are produced by means of commutator 11 and network 17.

FIG. 3b also illustrates the additional provision of a repeater device 16 of the kind described in connection with FIG. 2b.

FIG. 4 shows an arrangement wherein each of the two images 4,5 is obtained from two interlaced, relatively differently colored images. By adoption of this kind of arrangement it is possible to improve vertical resolution.

In FIG. 3b the pictorial information-signal-sequence for green is reproduced completely at every moment while the pictorial information-signal-sequence for red and blue is only sequentially reproduced.

In FIG. 4b, on the other hand, all three colors red, green and blue are reproduced at every moment.

The interlaced reproduction of two relatively differently colored images is obtained, for example as shown in FIG. 5, by a division of the picture into bands 18 corresponding to one color extract and the intervening bands 19 corresponding to the other color extract.

The lay-out, the filter characteristic and the production of scan-pattern filtered images 4 and/or 5 may be arranged, for example, as described in my prior copending application, aforementioned.

In order to eliminate with certainty any side-to-side or cross-talk displacement of the color information of one scanning band into that of the other band, an electro-optical transducer may be provided which comprises at least two different terminals, and an additional switch 8. Advantageously the two scanning band systems 18,19 are intermeshed as shown in FIG. 6.

While the present invention has been disclosed in connection with the described embodiments, it is not be so limited but is to be limited solely by the claims which follow.

What is claimed is:

1. In a method of reproducing a moving colored picture on the screen of a television receiver, including the steps of:
   optically splitting the picture into two images; filtering the images to extract different colors therefrom; sequentially scanning the color extract images to generate a corresponding time spaced single sequence of video signals;
   repeating the scanning of at least one of the two images; inserting a corresponding repeated signal sequence between the time spaced signal sequences to establish a continuous uninterrupted signal train from which the color signals are separated;
   retrieving the stored signals within time spaced signal sequences respectively corresponding to at least one of the color extract images; and
   separating said time spaced signal sequences into three primary color signals for modulating a video information signal carrier.

2. The method of claim 1 wherein said step of storing of the single sequence of video signals comprises recording the video signals on an information carrying medium.

3. The method of claim 1 wherein said step of filtering the images includes extracting two different colors in intermeshed relation to each other from at least one of the two images and extracting at least a third different color from the other of the two images; two of the time spaced signal sequences being derived from said scanning of said one of the two images.

4. The method of claim 3 wherein the color extracts associated with said one of the two images are interrelated so that said scanning produces a pulse-modulated signal within a fundamental frequency range of 0.02 MHz to 2.0 MHz.

5. The method of claim 3 wherein two different colors are extracted from each of said two images, one of said colors being predominantly green.

6. The method of claim 5 wherein the color extracts associated with said one of the two images are interrelated so that said scanning produces a pulse-modulated signal within a fundamental frequency range of 0.02 MHz to 2.0 MHz.

7. The method of claim 6 wherein said step of storing of the single sequence of video signals comprises recording the video signals on an information carrying medium.

* * * * *